United States Patent [19]

Green

[11] Patent Number: 4,872,440

[45] Date of Patent: Oct. 10, 1989

[54] AIR AND FUEL MIXING DEVICES FOR INTERNAL COMBUSTION ENGINES

[76] Inventor: Kenneth L. Green, 1070 NE. 1st St., Miami, Fla. 33138

[21] Appl. No.: 259,315

[22] Filed: Oct. 18, 1988

[51] Int. Cl.$^4$ ............................................. F02M 29/00
[52] U.S. Cl. ................................... 123/590; 123/527; 48/189.4
[58] Field of Search ........................ 123/525, 527, 590; 48/189.4; 261/16

[56] References Cited

U.S. PATENT DOCUMENTS

| | | | |
|---|---|---|---|
| 4,058,102 | 11/1977 | Fabritz | 123/590 |
| 4,364,364 | 12/1983 | Subramaniam | 123/525 |
| 4,370,969 | 2/1983 | Zarrelli et al. | 123/590 |
| 4,479,466 | 10/1984 | Greenway et al. | 123/525 |
| 4,497,304 | 2/1985 | Wintrell et al. | 123/527 |

*Primary Examiner*—E. Rollins Cross
*Attorney, Agent, or Firm*—Burns, Doane, Swecker and Mathis

[57] ABSTRACT

An air fuel mixing device for internal combustion engines comprises a ring section having air passages leading to an interior volume, a cap section for supplying fuel, and a mixing body disposed between the cap section and ring section. The mixing body includes a frusto-conical member through which a plurality of fuel passages extend parallel to the cone axis. The fuel passages form fuel outlets in a frusto-conical surface disposed in the interior volume and facing the air passages. Incoming air passes across the fuel outlets to suck fuel into the interior volume. Depressions in the frusto-conical surface induce turbulence in the incoming air to promote mixing of air and fuel. The ring section comprises relatively rotatable rings with mutually alignable slots for forming the air passages. The slots are selectively misalignable to a desired extent for regulating the amount of incoming air so that the mixing device can be suited to the different needs of various engines.

13 Claims, 5 Drawing Sheets

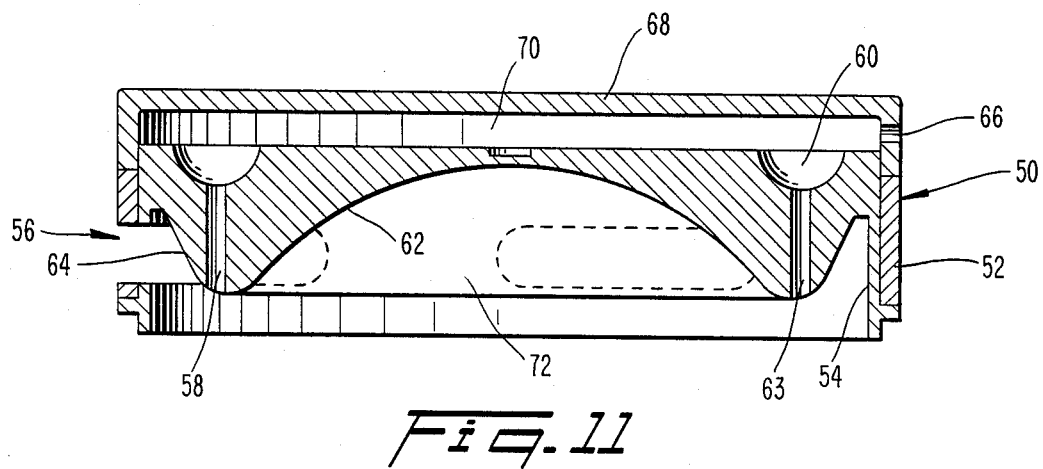

AIR AND FUEL MIXING DEVICES FOR INTERNAL COMBUSTION ENGINES

BACKGROUND AND OBJECTS OF THE INVENTION

The present invention relates to air/fuel mixers for internal combustion engines.

In U.S. Pat. No. 4,479,466 (the disclosure of which is incorporated herein by reference), there are disclosed air/fuel mixers for internal combustion engines, especially for engines of the type which use natural gas as a fuel. One disclosed embodiment therein involves a ring which has air inlet passages and which defines an internal volume to which air is introduced. A mixer body is provided which includes a truncated frusto-conical portion through which is formed a plurality of fuel passages. The fuel passages form outlets in a truncated frusto-conical surface of that portion, which surface is disposed within the internal volume of the ring. The air entering the internal volume under the influence of engine vacuum passes across the fuel outlets to draw fuel into the internal volume for being mixed with the air. A mixing chamber is formed at a truncated end of the truncated conical portion. Air and fuel passing across that chamber create a vacuum within the chamber which causes air and fuel to be drawn into the chamber for a more intensive mixing.

It has been found that such an arrangement operates satisfactorily for certain types of fuel, such as natural gas. However, for heavier fuels, such as diesel fuel, the incoming air may exhibit difficulty in drawing sufficient amounts of fuel through the fuel passages. Also, an incomplete mixing of the fuel and air may occur. Furthermore, the device is not as versatile as would be desired since separate devices must be designed for different engines in order to provide air inlet passages of proper size to admit an amount of air required by the particular engine.

SUMMARY OF THE INVENTION

The present invention involves a fuel and air mixing device for use with an internal combustion engine. The device comprises a ring assembly positionable adjacent an air/fuel intake of an engine and defining an interior volume for the mixing of fuel and air. The ring assembly includes air inlet passages arranged in a cylindrical periphery of the ring assembly. A mixer body comprises a plurality of fuel passages each having an inlet and outlet, the inlets communicating with a fuel source, and the outlets communicating with the interior volume such that a flow of air into the interior volume and across the fuel passage outlets draws fuel through the fuel passages and into the interior volume to be mixed with the air. The ring assembly includes a stationary part and a movable part for adjusting the size of the air inlet passage means for regulating the amount of incoming air.

Preferably, the ring assembly comprises first and second coaxial telescopingly arranged rings, the first ring defining the stationary part and the second ring defining the movable part. Each of the rings includes a cylindrical wall having apertures, whereby the associated apertures of both rings are mutually alignable to form the air passages. The second ring is rotatable relative to the first ring about a common axis of the first and second rings for regulating the size of the air passages.

Preferably, the mixer body comprises an end surface and a frusto-conical portion having a frusto-conical surface extending away from the end surface. The fuel passages extend through the end surface and the frusto-conical portion to form fuel passage inlets in the end surface and fuel passage outlets in the frusto-conical surface. A plurality of depressions are formed in the frusto-conical surface to impart turbulence to air flowing across the frusto-conical surface.

BRIEF DESCRIPTION OF THE DRAWING

The objects and advantages of the invention will become apparent from the following description of preferred embodiments thereof in connection with the accompanying drawings, in which like numerals designate like elements, and in which:

FIG. 11 is a longitudinal sectional view taken through a second embodiment of the present invention.

DETAILED DESCRIPTION OF PREFERRED EMBODIMENTS OF THE INVENTION

Figure 1:
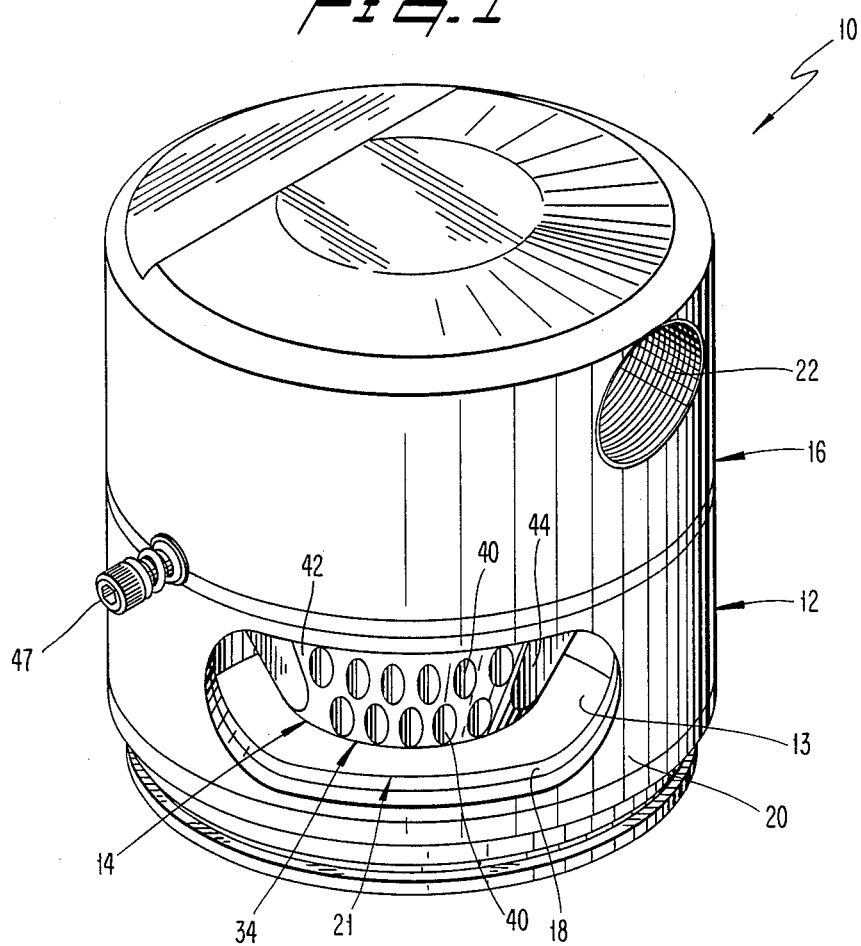
FIG. 1 is a top perspective view of one embodiment of a mixing device according to the present invention.
Figure 2:
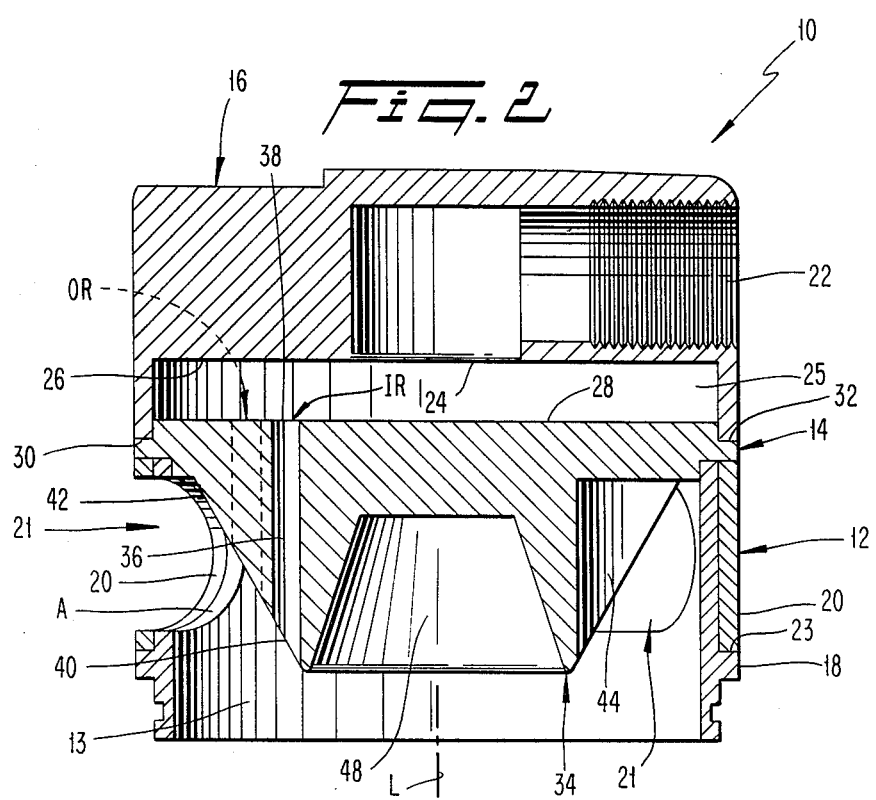
FIG. 2 is a longitudinal sectional view of the mixing device of FIG. 1.
Figure 3:
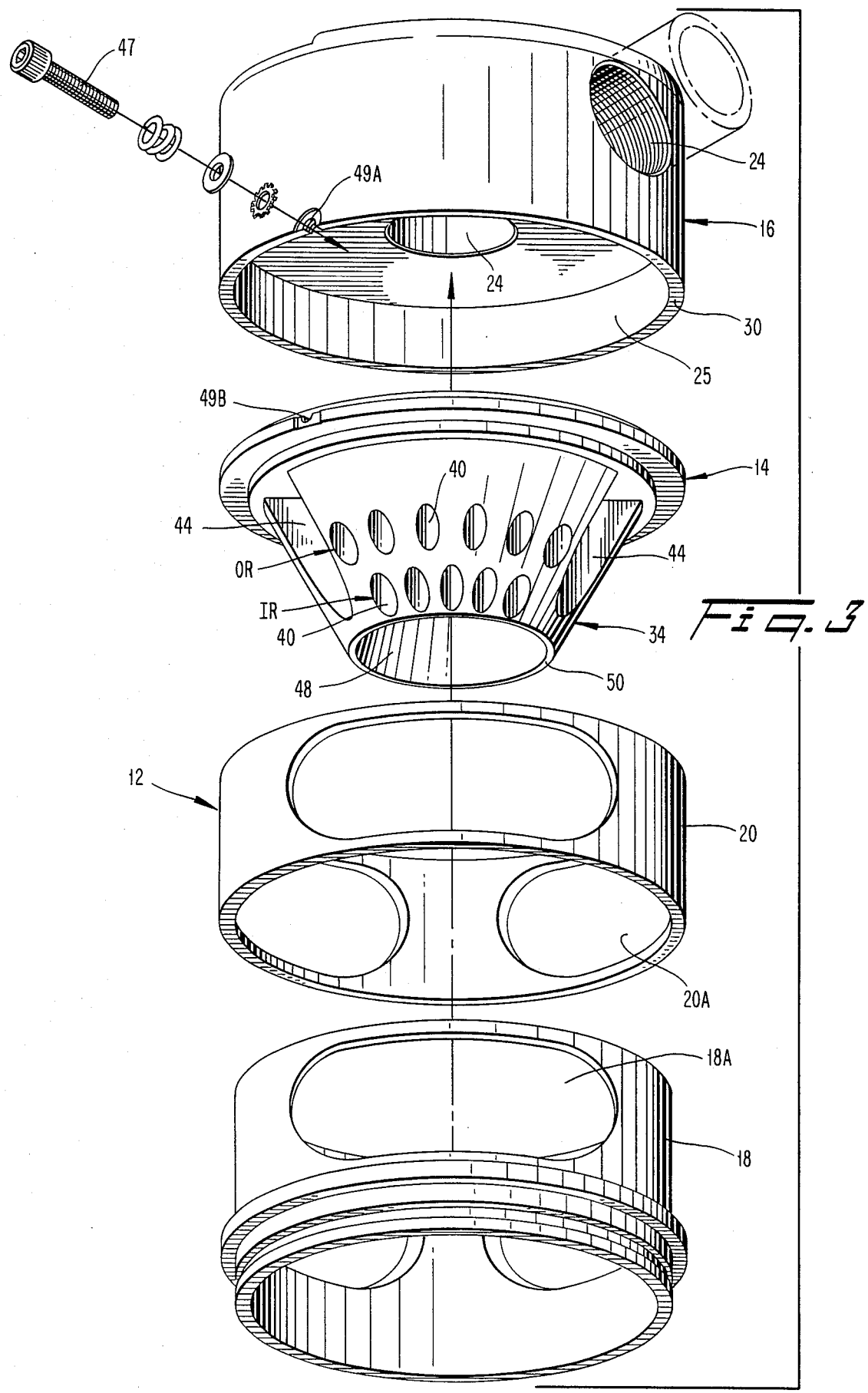
FIG. 3 is an exploded bottom perspective view of the mixing device of FIG. 1.
Figure 4:
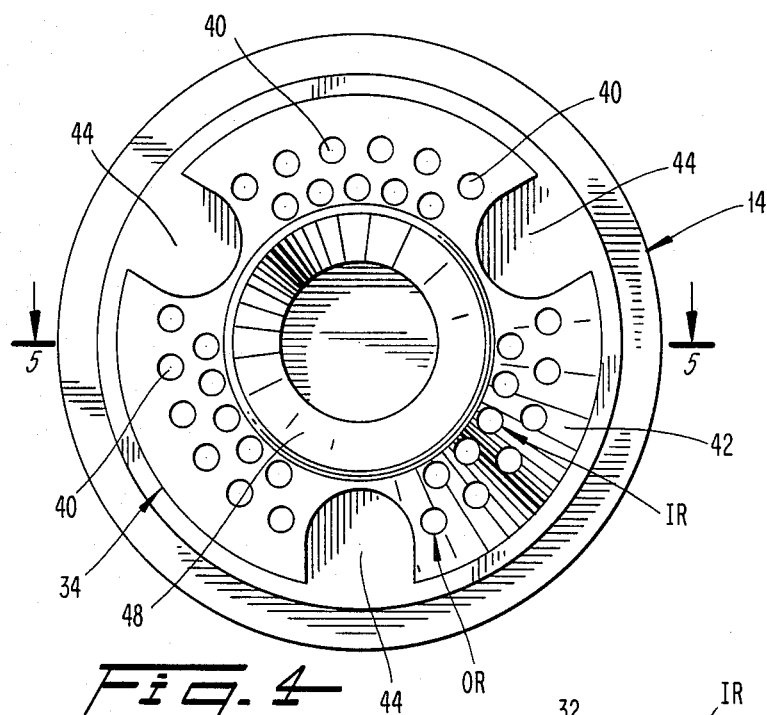
FIG. 4 is a bottom plan view of a mixing body portion of the mixing device of FIG. 1.
Figure 5:
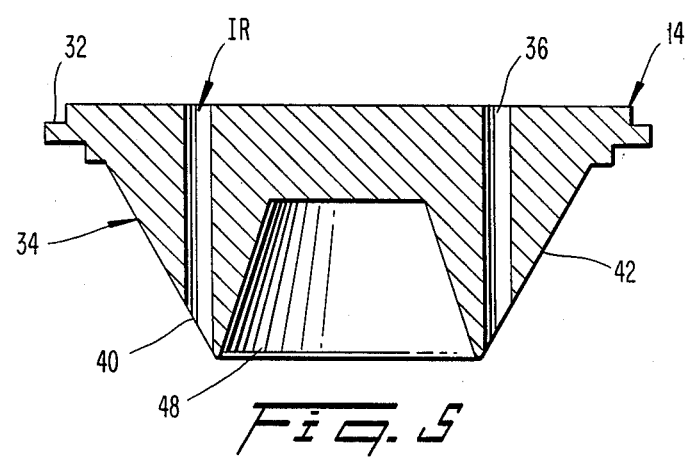
FIG. 5 is a longitudinal sectional view taken along line 5—5 in FIG. 4.
Figure 6:
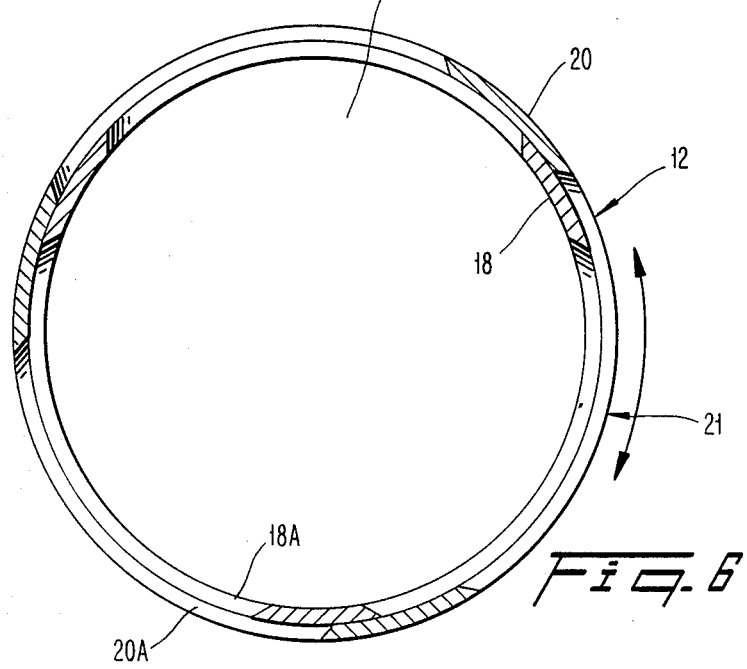
FIG. 6 is a cross-sectional view taken through a ring portion of the mixing device.
Figure 7:
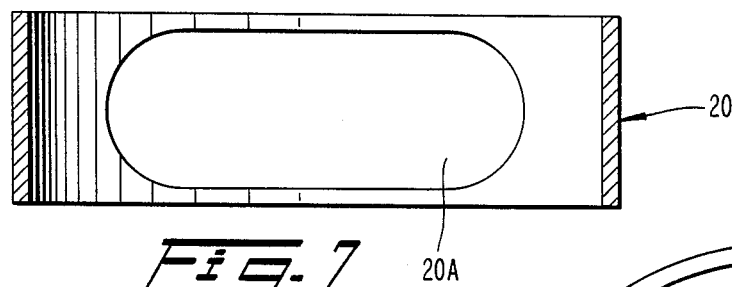
FIG. 7 is a longitudinal sectional view taken through a slip ring.
Figure 8:
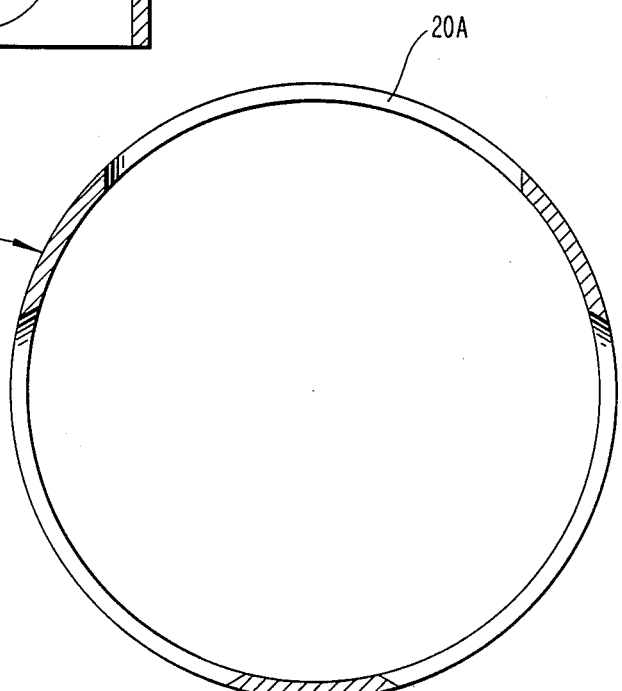
FIG. 8 is a cross-sectional view taken through the slip ring.
Figure 9:
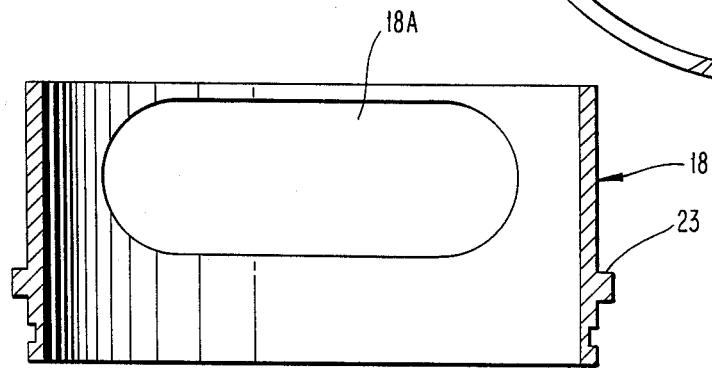
FIG. 9 is a longitudinal sectional view taken through the base ring.
Figure 10:
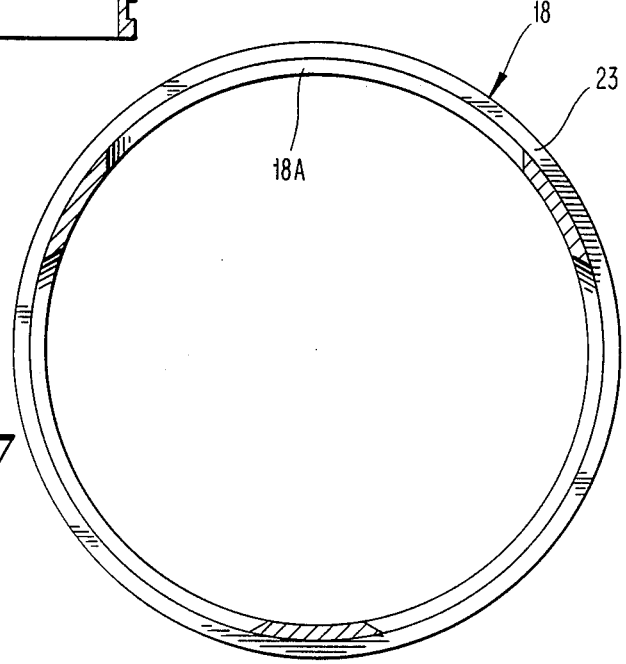
FIG. 10 is a cross-sectional view taken through the base ring.

Depicted in FIGS. 1-10 is a fuel and air mixing device 10 constructed for placement and operation adjacent the air/fuel intake of an internal combustion engine such as a diesel engine, for example. Diesel fuel is a preferred fuel for use in the present invention, although other suitable types of fuel could alternatively be used.

The device 10 comprises a cylindrical lower base 12, a mixer body 14 and a fuel delivery cap 16. The base 12 defines an internal volume 13 and comprises a ring assembly composed of a stationary base ring 18 and a slip ring 20 rotatably mounted on the bottom ring. The rings 18, 20 contain air inlet apertures 18A, 20A in the form of circumferentially elongated slots spaced circumferentially around the cylindrical periphery of the respective ring 18, 20. The apertures 18A in the base ring are of the same size, quantity and spacing as the apertures 20A in the slip ring. By rotating the slip ring relative to the base ring, the apertures 20A can be brought into full or partial alignment with apertures 18A, thereby relating the effective size of air inlet passages 21 defined jointly by the associated pairs of the apertures. In this manner, the mixing device can be adjusted in accordance with the air/fuel parameters specific to each application, i.e., each particular engine, of the device.

The slip ring 20 is preferably formed with close tolerances to create sufficient frictional resistance to rotation in order to assure that the position to which the slip ring has been adjusted will be maintained despite vibrations to which the device may be subjected. The slip ring rests longitudinally against a radial shoulder 23 of the base ring 18.

The cap 16 comprises a threaded fuel inlet port 22 extending laterally into a side wall of the cap, and a fuel outlet port 24 extending longitudinally downwardly into communication with a fuel distribution cell 25 formed between a bottom surface 26 of the cap and a top end surface 28 of the mixer body 14. Creation of the cell 25 results since the cap bottom surface 26 is recessed upwardly from a lower rim 30 of the cap, which rim rests longitudinally against a radial shoulder 32 of the mixer body 12.

The mixer body 14 comprises the top end surface 28 and a frusto-conically shaped downwardly projecting portion 34. Formed in the mixer body is a plurality of fuel conducting passages 36 which communicate with the fuel distribution cell 25 and extend parallel to a longitudinal axis L of the frusto-conical portion. Preferably, each fuel passage 36 is formed by drilling longitudinally through the mixer body so as to create a fuel inlet 38 in the end surface 28 and a fuel outlet 40 in a frusto-conical surface 42 of the portion 34.

The fuel passages 36 can be selectively arranged in various patterns, but are preferably arranged as inner and outer concentric annular rows IR, OR of fuel passages, the outer row being spaced farther from the longitudinal axis than the inner group.

Disposed in the outer frusto-conical surface 42 between circumferentially spaced groups of fuel outlets 40 is a plurality of depressions or recesses 44. The depressions 44 function to impart a high degree of turbulence to the incoming air, thereby enhancing the intermixing of the air and the fuel emerging from the fuel outlets 40. The depressions extend for a substantial portion of the length of the frusto-conical portion 34 and have a maximum depth (i.e., radially of the axis L greater than one-half the length of the depressions.

Further enhancement of the mixing is created by means of a mixing chamber 48 formed in the bottom truncated end of the frusto-conical portion 34. That mixing chamber 48 comprises a downwardly opening, upwardly narrowing recession within which a vacuum is created by the flow of air and fuel thereacross. As a result, fuel and air are drawn into the mixing chamber to be more thoroughly mixed.

The longitudinal length of the frusto-conical portion (i.e., the dimension thereof parallel to the axis L) is greater than the cross-sectional diameter of the bottom truncated end 50 of the frusto-conical portion to improve the mixing performance within the internal volume of the ring assembly, as well as to provide sufficient area for the multiple annular rows of fuel passages 36. The cap 16 is secured to the mixing body 14 in any suitable manner, such as by a screw 47 which engages aligned hole portions 49A, 49B in the cap and mixing body.

The mixing device can be attached to an engine in any suitable manner such as by bolts or clamps for example, or may be positioned within an air-permeable canister.

The disclosed embodiment of FIGS. 1–10 is designed for engines having displacements of about 250 to 500 cubic inches. For such an embodiment, each of the fuel apertures 36 is preferably formed with a 3/16 drill to obtain a 0.375 diameter. Each of the air apertures 18A, 20A has a circumferential length (not including the arcuate end portions) of 0.375 inches, and a width (height) of 1.228 inches, such that the total area of the opening is about 3.773 square inches. For operation with engines having displacements of greater than 500 cubic inches or less than 250 cubic inches, it is believed that air passages should be adjusted so that the ratio of the area of the air passages to the area of the fuel passages 36 should be maintained at about 13.469:1.

In operation, air enters the interior volume 13 through the air passages 21, the latter having been adjusted to a desired area by rotation of the slip ring 20 relative to the stationary base ring 18. The entering air encounters the depressions 44 and becomes highly turbulent. As the turbulent air passes across the two rows of fuel outlets 40, fuel is drawn through those outlets and is mixed with the air. A thorough mixing is promoted by the turbulence of the air and the mixing chamber 48. Due to the increased number of fuel passages, it is assured that sufficient fuel, especially in the case of diesel fuel, will be supplied. The added turbulence caused by the depressions makes it possible to achieve a thorough mixing of that large amount of fuel.

An alternative embodiment of the invention is depicted in vertical cross-section in FIG. 11 and is particularly adapted for the feeding of gaseous fuel. That device 50 is similar to the embodiment described in connection with FIG. 3 of the afore-mentioned U.S. Pat. No. 4,479,466 with the addition of a slip ring 52 around the outer perimeter of the stationary base ring 54 for adjusting the size of the air inlet passages 56. Thus, the mixer body 50 comprises a single annular row of fuel passages 58 interconnected by a circular groove 60. The fuel passages 58 extend downwardly through a frusto-conical portion 62 and form fuel outlets 63 disposed within a frusto-conical outer surface 64 thereof. Those outlets 63 are acted upon by air emerging from the adjustable air passages 56 to suck diesel fuel through the fuel passages. Since the air passages are adjustable, the amount of incoming air flow can be regulated and, as a consequence, the amount of aspirated fuel flow can also be regulated to satisfy the air/fuel requirements of the particular engine involved.

The fuel is supplied through a lateral entry port 66 in a cap 68, the entry port leading to a fuel distribution cell 70 located above the inlets of the fuel passages. A downwardly opening mixing chamber 72 is formed in the truncated bottom end of the frusto-conical portion 62 to enhance the mixing action. If needed, turbulence-inducing depressions similar to those disclosed earlier at 44 herein, could be formed in the truncated conical surface 64 to intensify the turbulence within the internal volume.

Although the present invention has been described in connection with preferred embodiments of the invention, it will be appreciated by those skilled in the art that additions, substitutions, modifications, and deletions not specifically described may be made without departing from the spirit and scope of the invention as defined in the appended claims.

What is claimed is:

1. A fuel and air mixing device for use with an internal combustion engine, comprising:
  ring means positionable adjacent an air/fuel intake of an engine and defining an interior volume for the mixing of fuel and air, said ring means including air inlet passage means arranged in a cylindrical periphery of said ring means, and a mixer body comprising a plurality of fuel passages each having an inlet and outlet, said inlets communicating with a fuel source, said outlets communicating with said interior volume such that a flow of air into said interior volume and across said fuel passage outlets draws fuel through said fuel passages and into said interior volume to be mixed with the air, said ring means including a stationary part and a movable part for adjusting the size of said air inlet passage means for regulating the amount of incoming air.

2. A device according to claim 1, wherein said mixer body comprises an end surface and a frusto-conical portion having a frusto-conical surface extending away from said end surface, said fuel passages extending through said end surface and said frusto-conical portion to form said fuel passage inlets in said end surface and said fuel passage outlets in said frusto-conical surface, and a plurality of depressions formed in said frusto-conical surface to impart turbulence to air flowing across said frusto-conical surface.

3. A device according to claim 2, wherein said frusto-conical portion has a longitudinal length greater than the smallest cross-sectional width thereof.

4. A device according to claim 2 including a mixing chamber formed in a truncated end of said conical portion and opening in a direction away from said end surface.

5. A device according to claim 2, wherein said fuel passages comprise first and second annular rows of fuel passages arranged concentrically around a longitudinal axis of said frusto-conical portion at first and second distances, respectively, therefrom.

6. A device according to claim 5, wherein said fuel passage outlets comprise a plurality of circumferentially spaced groups of fuel passage outlets, said depressions disposed between two of said groups.

7. A device according to claim 2 including a cap containing a fuel delivery conduit communicable with a source of fuel, said cap and said end surface defining a fuel distribution chamber communicating with said fuel passage inlets.

8. A device according to claim 1, wherein said ring means comprises first and second coaxial telescopingly arranged rings, said first ring defining said stationary part and said second ring defining said movable part, each of said rings including a cylindrical wall having apertures, associated apertures of both rings being mutually alignable to form said air passage means, said second ring being rotatable relative to said first ring about a common axis of said first and second rings for regulating the size of said air passage means.

9. A device according to claim 1, wherein said fuel passage inlet ends communicate with a source of diesel fuel.

10. A fuel and air mixing device for use with an internal combustion engine, comprising:

ring means defining an internal volume and positionable such that said internal volume communicates with an air/fuel inlet of an internal combustion engine, said ring means including air passage means arranged in a cylindrical periphery of said ring means, a mixer body including an end surface and a frusto-conical portion including a frusto-conical surface extending away from said end surface and into said interior volume, a plurality of depressions formed in said frusto-conical surface to impart turbulence to air flowing across said frusto-conical surface, and a plurality of fuel passage extending through said end surface and said frusto-conical portion to form fuel passage inlets in said end surface and fuel passage outlets in said frusto-conical surface, said fuel passage inlets being communicable with a fuel source such that the fuel is conducted through said fuel passages, whereby turbulent air within said interior volume flowing across said fuel passage outlets draws fuel through said fuel passage outlets to be mixed with air in said interior volume.

11. A device according to claim 10 including a cap forming a fuel distribution cell above said end surface.

12. A fuel and air mixing device for use with an internal combustion engine, comprising:

ring means defining an interior volume and positionable such that said interior volume communicates with an air/fuel inlet of an engine, said ring means including air passage means arranged in a cylindrical periphery of said ring means, a cap containing a fuel delivery conduit communicable with a source of fuel, and a mixer body disposed between said cap and a first end of said ring means and including:

an end surface facing said cap and forming a fuel distribution cell together therewith, and a frusto-conical portion including a frusto-conical surface extending away from said end surface and into said interior volume, a mixing chamber formed in a truncated end of said conical portion, said mixing chamber opening toward a second end of said ring means located opposite said first end, an axial length of said frusto-conical surface being longer than a minimum cross-sectional diameter thereof, a plurality of depressions formed in said frusto-conical surface to impart turbulence to air flowing across said frusto-conical surface, and a plurality of fuel passages extending through said end surface and said frusto-conical portion to form fuel passage inlets in said end surface and fuel passage outlets in said frusto-conical surface for communicating said fuel distribution cell with said interior volume, whereby turbulent air flow within said interior volume passing across said fuel passage outlets draws fuel through said fuel passages to be mixed with air in said interior volume and said mixing chamber, said ring means comprising first and second coaxial, telescopingly arranged rings one of which being rotatable relative to the other, each of said rings including a cylindrical wall having apertures, associated apertures of both rings being mutually alignable to form said air passage means, said associated apertures being selectively misalignable in response to rotation of said one ring for regulating the size of said air passage means.

13. A device according to claim 12, wherein said fuel delivery conduit communicates with a source of diesel fuel.

* * * * *